(12) United States Patent
Sakamoto et al.

(10) Patent No.: US 7,468,087 B2
(45) Date of Patent: Dec. 23, 2008

(54) FERTILIZER, PROCESS FOR PRODUCING THE SAME, PROCESS FOR CONTROLLING INORGANIZING SPEED OF UREA/ALIPHATIC ALDEHYDE CONDENSATION PRODUCT, AND PROCESS FOR GROWING CROPS

(75) Inventors: Atsushi Sakamoto, Minamata (JP); Noriaki Harada, Kitakyusyu (JP); Kenji Fukuda, Minamata (JP)

(73) Assignee: Chissoasahi Fertilizer Co., Ltd., Tokyo (JP)

( * ) Notice: Subject to any disclaimer, the term of this patent is extended or adjusted under 35 U.S.C. 154(b) by 280 days.

(21) Appl. No.: 11/448,409

(22) Filed: Jun. 7, 2006

(65) Prior Publication Data

US 2006/0283222 A1 Dec. 21, 2006

Related U.S. Application Data

(63) Continuation of application No. 10/002,620, filed on Dec. 5, 2001, now Pat. No. 7,108,732.

(51) Int. Cl.
C05C 9/00 (2006.01)
(52) U.S. Cl. ............... 71/28; 71/32; 71/44; 71/64.03
(58) Field of Classification Search ............ 71/28, 71/32, 44, 64.03
See application file for complete search history.

(56) References Cited

U.S. PATENT DOCUMENTS

| | | | |
|---|---|---|---|
| 2,955,930 A | 10/1960 | Kealy | |
| 3,119,683 A | 1/1964 | Kealy et al. | |
| 3,130,038 A | 4/1964 | Thomas et al. | |
| 3,205,061 A | 9/1965 | Mason, Jr. | |
| 3,219,432 A | 11/1965 | Schafer et al. | |
| RE27,238 E | 11/1971 | Stansburry et al. | |
| 3,630,751 A | 12/1971 | Ushioda et al. | |
| 3,979,198 A | 9/1976 | Bardsley | |
| 4,025,329 A | 5/1977 | Goertz | |
| 4,190,432 A | 2/1980 | Levitt | |
| 4,280,830 A | 7/1981 | Ferguson et al. | |
| 4,568,373 A | 2/1986 | Yasuhara et al. | |
| 4,804,401 A | 2/1989 | Wahlberg et al. | |
| 5,174,804 A | 12/1992 | Rehberg et al. | |
| 5,176,734 A | 1/1993 | Fujita et al. | |
| 5,549,730 A | 8/1996 | Aoki et al. | |
| 5,554,577 A | 9/1996 | Kempf et al. | |
| 5,554,730 A | 9/1996 | Woiszwillo et al. | |
| 6,500,223 B1 | 12/2002 | Sakai et al. | |

FOREIGN PATENT DOCUMENTS

| | | |
|---|---|---|
| DE | 120646 | 6/1976 |
| DE | 200083 | 3/1983 |
| EP | 0968980 | 1/2000 |
| JP | 46-24049 | 7/1971 |
| JP | 50-16265 | 6/1975 |
| JP | 50-134867 | 10/1975 |
| JP | 54-4759 | 1/1979 |
| JP | 54-20857 | 2/1979 |
| JP | 54-97262 | 8/1979 |
| JP | 55-80795 | 6/1980 |
| JP | 56-17994 | 2/1981 |
| JP | 56-78480 | 6/1981 |
| JP | 7-17788 | 1/1995 |
| JP | 7-69771 | 3/1995 |
| JP | 10-1381 | 1/1998 |

OTHER PUBLICATIONS

Catalog on a fertilizer comprising urea/acetaldehyde condensation product (CDU), *Chisso-ASAHI Fertilizer Co., Ltd.*

*Primary Examiner*—C. Sayala
(74) *Attorney, Agent, or Firm*—Leydig, Voit & Mayer, Ltd

(57) ABSTRACT

Disclosed are a fertilizer containing a sparingly water-soluble phosphatic fertilizer and an urea/aliphatic aldehyde condensation product. The process for controlling inorganizing speed of urea/aliphatic aldehyde condensation product comprises adding to the urea/aliphatic aldehyde condensation product a sparingly water-soluble phosphatic fertilizer having special elution characteristics. The fertilizer of the invention and the process for controlling inorganizing speed of urea/aliphatic aldehyde condensation product of the invention make it possible to control the inorganizing speed of the condensation product without changing the particle size or form. The fertilizers of the invention or the urea/aliphatic aldehyde condensation products can provide nitrogen components to plant in accordance with the periods of culture of desired crops and a pattern of absorbing nutrition. This is effective in saving of the number of additional fertilization or nitrogen components left in soil after the period of culture.

23 Claims, No Drawings

FERTILIZER, PROCESS FOR PRODUCING THE SAME, PROCESS FOR CONTROLLING INORGANIZING SPEED OF UREA/ALIPHATIC ALDEHYDE CONDENSATION PRODUCT, AND PROCESS FOR GROWING CROPS

CROSS-REFERENCE TO RELATED APPLICATIONS

This application is a continuation of U.S. application Ser. No. 10/002,620, filed Dec. 5, 2001, now U.S. Pat. No. 7,108,732 which claims the benefit of JP 2000-370488, filed Dec. 5, 2000, JP 2001-52465, filed Feb. 27, 2001, JP 2001-111208, filed Apr. 10, 2001, JP 2001-353340, filed Nov. 19, 2001, and JP 2001-357799, filed Nov. 22, 2001, the disclosures of which are incorporated herein by reference.

FIELD OF THE INVENTION

The present invention relates to fertilizer, a process for producing the same, a process for controlling the inorganizing speed of urea/aliphatic aldehyde condensation products, and a process for growing crops.

DESCRIPTION OF THE RELATED ART

When the urea/aliphatic aldehyde condensation products are used as slow release fertilizers, adjustment of the inorganizing speed of the condensation products enables adjustment of the efficacy of the fertilizers, and adjustment of particle size by granulation of the condensation products enables the adjustment of the inorganizing speed of the condensation products. Concretely, increase in the particle size achieves development of the efficacy of the fertilizers over a long period of time, and decrease in the particle size achieves development of the efficacy thereof for a comparatively short period of time.

When a urea/aliphatic aldehyde condensation product controlled in the efficacy by selecting the particle size and particularly large in particle diameter are used for soil, however, the inorganizing speed thereof gradually starts to lower immediately after using the condensation product for soil and extremely decreases since a certain period, and the efficacy of the fertilizer fails to develop in some cases although nitrogen components of the urea/aliphatic aldehyde condensation product are still left.

SUMMARY OF THE INVENTION

The present inventors have intensively studied in view of the aforesaid related art, and as a result found that joint use of a urea/aliphatic aldehyde condensation product and a sparingly water-soluble phosphatic fertilizer makes it possible to control the inorganizing speed of the condensation product without changing the particle size or form, that is, to control development of the efficacy of the condensation product used as a fertilizer, thus having accomplished the invention based on these findings.

The invention is constituted of the following items from (1) to (30):

(1) A fertilizer containing a sparingly water-soluble phosphatic fertilizer and a urea/aliphatic aldehyde condensation product.

(2) The fertilizer as described above in item 1 wherein the sparingly water-soluble phosphatic fertilizer having elution characteristics where after the sparingly water-soluble phosphatic fertilizer is dipped in 2 weight percent aqueous solution of citric acid at 30° C. in the weight ratio as shown by the following equation, the time required to allow elution of 80 weight percent of phosphate components contained in the phosphatic fertilizer into the aqueous solution of citric acid ranges from 0.1 to 2000 minutes:

Equation: (Sparingly Water-Soluble Phosphatic Fertilizer)/(2 Weight Percent Aqueous Solution of Citric Acid) (in Weight Ratio)=0.013

(3) The fertilizer as described above in item 1 wherein the sparingly water-soluble phosphatic fertilizer is one or more selected from phosphorus ore, fused phosphate fertilizer, and calcined phosphate fertilizer.

(4) The fertilizer as described above in item 1 wherein the ratio of the sparingly water-soluble phosphatic fertilizer to the urea/aliphatic aldehyde condensation product ranges from 0.01 to 5 weight percent in conversion to $P_2O_5$.

(5) The fertilizer as described above in item 1 wherein the urea/aliphatic aldehyde condensation product is 2-oxo-4-methyl-6-ureidohexahydropyrimidine or formaldehyde-condensed urea.

(6) The fertilizer as described above in item 1 wherein the ratio of a water-soluble phosphate used to the urea/aliphatic aldehyde condensation product is 0.5 weight percent or less in conversion to $P_2O_5$.

(7) The fertilizer as described above in item 1 wherein the form is particulate.

(8) The fertilizer as described above in item 7 wherein the particle size ranges from 1 to 50 millimeters.

(9) The fertilizer as described above in item 7 containing further therein a water-repellent substance.

(10) The fertilizer as described above in item 9 wherein the water-repellent substance has a melting point falling in the range of from 60 to 130° C.

(11) The fertilizer as described above in item 9 wherein the water-repellent substance is one or more selected from natural wax and synthetic wax.

(12) The fertilizer as described above in item 11 wherein the natural wax is one or more selected from hardened castor oil and derivatives thereof.

(13) The fertilizer as described above in item 9 wherein the ratio of the water-repellent substance to the total amount of the sparingly water-soluble phosphatic fertilizer, the water-repellent substance, and the urea/aliphatic aldehyde condensation product ranges from 0.1 to 20 weight percent.

(14) A process for producing the fertilizer as described above in item 9 comprising a step of granulating particles by use of the water-repellent substance, the sparingly water-soluble phosphatic fertilizer, the urea/aliphatic aldehyde condensation product, and water as raw materials (step of granulation) and a step of drying the paticles by use of a gas held at a temperature not lower than the melting point of the water-repellent substance and not higher than 500° C. (step of drying).

(15) The process as described above in item 14 wherein the temperature of the raw materials in the step of granulation is a temperature from 0 to 40° C. lower than the melting point of the water-repellent substance.

(16) The process as described above in item 14 wherein the granulation of the particles in the step of granulation is carried out by use of a stirring-type mixing granulator.

(17) The process as described above in item 14 wherein the water-repellent substance is particulate.

(18) The process as described above in item 17 wherein the particle size of the particulate water-repellent substance ranges from 0.005 to 1 millimeter.

(19) The process as described above in item 14 wherein the ratio of water ranges from 5 to 30 weight percent to the total amount of the water-repellent substance, the sparingly water-soluble phosphatic fertilizer, and the urea/aliphatic aldehyde condensation product.

(20) A process for controlling an inorganizing speed of the urea/aliphatic aldehyde condensation product characterized by adding to the urea/aliphatic aldehyde condensation product the sparingly water-soluble phosphatic fertilizer having elution characteristics where after the sparingly water-soluble phosphatic fertilizer is dipped in 2 weight percent aqueous solution of citric acid at 30° C. in the weight ratio as shown in the following equation, the time required to allow elution of 80 weight percent of phosphate components contained in the phosphatic fertilizer into the aqueous solution of citric acid ranges from 0.1 to 2000 minutes:

Equation: (Sparingly Water-Soluble Phosphatic Fertilizer)/(2 Weight Percent Aqueous Solution of Citric Acid) (in Weight Ratio)=0.013

(21) The process as described above in item 20 wherein the ratio of the sparingly water-soluble phosphatic fertilizer to the urea/aliphatic aldehyde condensation product ranges from 0.01 to 5 weight percent in conversion to $P_2O_5$.

(22) The process as described above in item 20 wherein the urea/aliphatic aldehyde condensation product is 2-oxo-4-methyl-6-ureidohexahydropyrimidine or formaldehyde-condensed urea.

(23) The process as described above in item 20 characterized by adding further a water-repellent substance.

(24) The process as described above in item 23 wherein the water-repellent substance has a melting point falling in the range of from 60 to 130° C.

(25) The process as described above in item 23 wherein the water-repellent substance is one or more selected from natural waxes and synthetic waxes.

(26) The process as described above in item 25 wherein the natural wax is one or more selected from hardened castor oil and derivatives thereof.

(27) The process as described above in item 23 wherein the ratio of the water-repellent substance to the total amount of the sparingly water-soluble phosphatic fertilizer, the water-repellent substance, and the urea/aliphatic aldehyde condensation product ranges from 0.1 to 20 weight percent.

(28) A urea/aliphatic aldehyde condensation product having an inorganizing speed controlled according to the process for controlling the inorganizing speed as described in any one of the aforesaid items from 23 to 27.

(29) A process for growing crops characterized by using the fertilizer as described in any one of the aforesaid items from 1 to 13.

(30) A process for growing crops characterized by using the urea/aliphatic aldehyde condensation product as described above in item 28.

DETAILED DESCRIPTION OF THE INVENTION

The sparingly water-soluble phosphatic fertilizers essential to the invention are not particularly limited as long as the fertilizers are sparingly soluble in water and able to provide phosphate components required for normal growth of plants. The sparingly water-soluble phosphatic fertilizers may be those containing phosphate compounds of low solubility as principal components, the fertilizers further include those having undergone fixation of water-soluble phosphate components by making sparingly soluble in water, those covered with water-insoluble or hydrophobic substances in the surfaces of particulate phosphatic fertilizers, and furthermore those prepared by mixing and granulating finely divided powder of the phosphatic fertilizer and water-insoluble or hydrophobic finely-divided powder of a substance other than phosphatic fertilizers.

Of these, the phosphate compounds of low solubility are preferred because the compounds can be used comparatively simply. Concretely, substances whose solubility in water is 5 grams/100 milliliters or less are desirable, and examples thereof include fused phosphate fertilizers, processed phosphate fertilizers, fumic acid-mixed phosphate fertilizers, calcined phosphate fertilizers, Rhenania-Phosphate, by-product dicalcium phosphate, by-product tricalcium phosphate, Thomas phosphatic fertilizers, potassium metaphosphate, calcium metaphosphate, magnesium metaphosphate, potassium magnesium metaphosphate, and phosphorus ore. Of these, fused phosphate fertilizers, calcined phosphate fertilizers, and phosphorus ore are preferably used in the invention particularly because of low solubility in water.

It is particularly preferable that the sparingly water-soluble phosphatic fertilizers used in the invention have elution characteristics where after the fertilizers are dipped in 2 weight percent aqueous solution of citric acid at 30° C. in weight ratio as shown by the following equation, the time required to allow elution of 80 weight percent of phosphate components into the aqueous solution of citric acid ranges from 0.1 to 2000 minutes.

Equation: (Sparingly Water-Soluble Phosphatic Fertilizer)/(2 Weight Percent Aqueous Solution of Citric Acid) (in Weight Ratio)=0.013

The elution time can be measured according to the following procedure. In a 300-milliliter plastic bottle, 2 grams of the sparingly water-soluble phosphatic fertilizer and 150 milliliters of 2 weight percent aqueous solution of citric acid that is heated at 30° C. are placed and shaken in a constant temperature bath for shaking held at 30° C. At intervals, small portions of the supernatant of the citric acid solution are sampled and diluted with water, and phosphate components in the diluted solution are determined by ion chromatography to draw an elution curve. Thereby, the time required to allow elution of 80 weight percent of the phosphate components contained in the sparingly water-soluble phosphatic fertilizer can be found.

When the elution time ranges from 0.1 to 2000 minutes, the inorganizing speed of the urea/aliphatic aldehyde condensation products can be controlled with ease. When the time fails to reach 0.1 minute or exceeds 2000 minutes, the control of the inorganizing speed may become difficult in some cases.

In order that the elution time of the phosphatic fertilizers falls in the range of from 0.1 to 2000 minutes, it is preferable that the sparingly water-soluble phosphatic fertilizers have low solubility in water and are made of single crystal form. Moreover, when the form is particulate, gaps in particle are preferably small.

Methods to regulate the elution time of the sparingly water-soluble phosphatic fertilizers used in the invention so as to fall in the range of from 0.1 to 2000 minutes are not particularly limited. For example, the methods include an adjustment of the size of particles prepared from the sparingly water-soluble phosphatic fertilizer, coat of the surface of the particulate phosphatic fertilizer with a water-insoluble or hydrophobic substance, and mixing and granulation of the phosphatic fertilizer of finely divided powder and a water-insoluble or hydrophobic finely-divided powder of a substance other than the phosphatic fertilizers.

Of these, the method of adjusting the size of particles prepared from the phosphatic fertilizers is preferred because the method can be carried out comparatively easily. Although the particle size varies depending upon the kind of the sparingly water-soluble phosphatic fertilizers used or the elution time required, the particle size in general ranges preferably from 0.1 to 2 millimeters in view of the method of the production and the adjustment of the inorganizing speed of the urea/aliphatic aldehyde condensation products.

In the invention the ratio of the sparingly water-soluble phosphatic fertilizers added is not particularly limited, but the ratio thereof to the urea/aliphatic aldehyde condensation products preferably ranges from 0.01 to 5 weight percent in conversion to $P_2O_5$. When the ratio of the phosphatic fertilizers falls in this range, the inorganizing speed of the urea/aliphatic aldehyde condensation products can be effectively controlled.

In the invention, the urea/aliphatic aldehyde condensation products are not particularly limited, and the usable condensation products can contain all molecular structures such as straight chains, branched chains, and cycles. Examples of the condensation products include a urea/formaldehyde condensation product, a urea/acetaldehyde condensation product, and a urea/isobutyl aldehyde. In the invention, one or more arbitrarily selected from these can be used.

Of the aforesaid urea/aliphatic aldehyde condensation products, 2-oxo-4-methyl-6-ureidohexahydropyrimidine that is a urea/acetaldehyde condensation product (hereinafter referred to as "CDU") and a urea/formaldehyde condensation product (hereinafter referred to as "ureaform") have been particularly difficult to control the inorganizing speed in soil. Therefore, the effect of the invention is more clearly shown when CDU or ureaform is applied to the invention.

The form of the urea/aliphatic aldehyde condensation products is not particularly limited, and can be any of slurry, particle, and mass. However, the form of the condensation products is preferably particulate in view of uniformity in mixing of the condensation products with the sparingly water-soluble phosphatic fertilizers.

When the urea/aliphatic aldehyde condensation products are particulate, the particle size thereof preferably ranges from 1 to 200 μm in view of handling properties in the production, compatibility with other raw materials, and granulation.

Although the ratio of the urea/aliphatic aldehyde condensation products contained in the fertilizers of the invention is not particularly limited, the content preferably ranges from 50 to 99.98 weight percent and more preferably from 75 to 99.98 weight percent.

When a water-soluble phosphoric acid is present in the fertilizers of the invention to some extent, the effect of the invention may be deteriorated in some cases. It is preferred therefore that the ratio of the water-soluble phosphoric acid to the urea/aliphatic aldehyde condensation products is 0.5 weight percent or less in conversion to $P_2O_5$. From this viewpoint, the sparingly water-soluble phosphatic fertilizers are preferably phosphorus ore and/or fused phosphate fertilizers.

The process for producing the fertilizers of the invention is not particularly limited. Concretely, a sparingly water-soluble phosphatic fertilizer is added to and mixed with a urea/aliphatic aldehyde condensation product taking any form of slurry, powder, and mass to produce the fertilizer of the invention. The urea/aliphatic aldehyde condensation products used herein are preferably used in powdery form in view of uniform dispersion with the sparingly waster-soluble phosphatic fertilizers.

On the other hand, the sparingly water-soluble phosphatic fertilizers that are added to and mixed with the urea/aliphatic aldehyde condensation products are preferably used in finely divided particle form in view of uniformity in mixing. In this case, however, the the sparingly water-soluble phosphatic fertilizers are liable to dissolve in soil, and may much more promote inorganization of the condensation products depending upon the particle size of the sparingly water-soluble phosphatic fertilizers of the finely divided particle form. Accordingly, the phosphatic fertilizers preferably have particle size of some degree.

Since the dissolving speed of the sparingly water-soluble phosphatic fertilizers into soil varies depending upon the kind or the crystal form thereof, the particle size of the phosphatic fertilizers is difficult to limit unqualifiedly. When the particle size in general ranges from 0.15 to 2 millimeters, however, the balance of the production and the effect of controlling the inorganizing speed becomes satisfactory in many cases.

The form of the fertilizers of the invention is not particularly limited and can be any of powder, particle, stick, and plate, but preferably particle in view of storage and handling in fertilization.

Furthermore, in view of uniformity in mixing of the urea/aliphatic aldehyde condensation products and the sparing water-soluble phosphatic fertilizers, it is preferred that the particle size of the phosphatic fertilizers is close to that of the condensation products. Concretely, the particle size preferably ranges from 0.15 to 1 millimeter.

When the fertilizers of the invention are particulate, the particle size thereof is not particularly limited, but preferably ranges from 1 to 50 millimeters and more preferably from 1.5 to 50 millimeters. When the particle size is 1 millimeter or more, the effect of the invention is remarkably exerted. Exceeding 50 millimeters may make handling in fertilization difficult in some cases.

Methods for granulating particles of the fertilizers of the invention include rolling granulation, compressive granulation, stirring-type granulation, extrusive granulation, crushing-type granulation, fluidized-bed and fluidized-bed polyfunctional granulation, spray drying granulation, vacuum freeze granulation, and submerged granulation. Of these, preferred methods for the granulation in the invention are rolling granulation, compressive granulation, stirring-type granulation, and extrusive granulation.

In the invention, components other than the sparingly water-soluble phosphatic fertilizers and the urea/aliphatic aldehyde condensation products that are essential components in the invention can be used as raw materials as long as the effect of the invention is not deteriorated. The components include fertilizers, various granulating aids, and binders. It is desirable that these components are added when the phosphatic fertilizers and the condensation products are mixed.

The fertilizers meant herein include nitrogenous fertilizers such as urea, ammonium sulfate, ammonium chloride, ammonium nitrate, calcium cyanamide, and ammonium humate; phosphatic fertilizers such as monoammonium phosphate, diammonium phosphate, calcium superphosphate, triple superphosphate, multi-phosphate, and magnesia multi-phosphate; synthetic slow release fertilizers such as guanylurea sulfate, oxamide, and glycolurea; potassic fertilizers such as potassium sulfate, potassium chloride, potassium bicarbonate, potassium humate, and potassium silicate; organic fertilizers such as bone meal, oil cake, and offal, low-analysis fertilizers, two-component composite fertilizers, high-analysis fertilizers, liming materials, magnesia fertilizers, siliceous fertilizers, and trace-element fertilizers. In the invention, one or more selected from these fertilizers can be used as needed.

When fertilizers containing phosphate components such as phosphatic fertilizers, low-analysis, two-component composite fertilizers, high-analysis fertilizers, and organic fertilizers are used, it is preferred to consider the elution time and content of phosphate components contained.

Examples of the granulating aids include minerals such as bentonite, clay, kaolin, sericite, talc, terra abla, pumice, siliceous sand, silica, zeolite, perlite, and vermiculite; and vegetable matter such as rice hulls, sawdust, woody powder, pulp flock, and soybean powder. In the invention, one or more selected from these granulating aids can be used as needed.

Examples of the binders include gum arabic, sodium alginate; glycerin, gelatin, molasses, crystallite cellulose, pitch, carboxymethyl cellulose, hydroxyethyl cellulose, hydroxypropyl cellulose, poly[sodium acrylate], polyvinyl-pyrrolidone, alumina sol, cement, sodium polyphosphate, lignin sulfonate, polyvinyl alcohol, polyethylene glycol, surface active agents, starch, and raw materials of thermosetting resins. In the invention, one or more selected from these binders can be used as needed.

When the fertilizers of the invention is particulate, it is effective to form compositions by combination of the fertilizers of the invention with other particulate agricultural materials.

The agricultural materials include a variety of agricultural chemicals such as bactericides, insecticides, and herbicides, and the fertilizers as described above as well.

When the form of the fertilizers of the invention is particulate, further addition of water-repellent substances as raw materials to the fertilizers of the invention makes it possible to control the dissolution of the sparingly water-soluble phosphatic fertilizers and the urea/aliphatic aldehyde condensation products in soil, which enables the effect of the urea/aliphatic aldehyde condensation products to control over a much wider range.

The water-repellent substances usable in the invention are not particularly limited as long as the substances have moistureproofness and waterproofness. However, water-repellent substances having a melting point of from 60 to 130° C. and preferably from 60 to 100° C. can be preferably used in the invention.

Water-repellent substances having a melting point of 60° C. or above would stabilize the storage of the fertilizers of the invention in the summer season. The melting point of 130° C. or less requires no thermal treatment exceeding 130° C. in the production of the fertilizers of the invention, which protects the urea/aliphatic aldehyde condensation products from decomposing in the production.

In the invention, one or more selected appropriately from natural waxes and synthetic waxes are preferably used. Examples of the natural waxes include vegetable waxes such as candelilla wax, carnauba wax, rice wax, Japan wax, and jojoba wax; animal waxes such as bees wax, hydrous lanolin, and spermaceti; mineral waxes such as montan wax, ozocerite, and ceresine; and petroleum waxes such as paraffin wax, microcrystalline wax, and petrolatum. Examples of the synthetic waxes include synthetic hydrocarbons such as Fischer-Tropsch wax, polyethylene wax, and polypropylene wax; modified waxes such as derivatives of montan wax, derivatives of paraffin wax, and derivatives of microcrystalline wax; hydrogenated waxes such as hardened castor oil and derivatives thereof; 12-hydroxystearic acid; stearic acid amide; phthalic acid imide; and chlorinated hydrocarbons. Of these, use of hardened castor oil and derivatives thereof is effective in control of the inorganizing speed of the urea/aliphatic aldehyde condensation products.

In the invention the ratio of the water-repellent substances used to the total amount of the sparingly water-soluble phosphatic fertilizer, the water-repellent substance, and the urea/aliphatic aldehyde condensation product ranges from 0.1 to 20 weight percent and more preferably from 1 to 15 weight percent. The ratio less than 0.1 weight percent may fail to exert sufficiently the effect of the water-repellent substances in some cases. On the other hand, exceeding 20 weight percent may make it difficult to acquire the effect corresponding to production costs.

Processes for producing the fertilizers of the invention that further contain the water-repellent substances as raw materials and are in particulate form are not particularly limited. However, the following process is carried out in general. That is, particles of a water-repellent substance, a sparingly water-soluble phosphatic fertilizer, a urea/aliphatic aldehyde condensation product, and water that are used as raw materials are subjected to granulation (a step of granulation), and subsequently drying of the resulting paticles is carried out by use of a gas whose temperature is higher than the melting point of the water-repellent substance and lower than 500° C. (a step of drying).

In the step of granulation, the water-repellent substance, the sparingly water-soluble phosphatic fertilizer, the urea/aliphatic condensation product, and water that are raw materials are first mixed, and the resulting mixture is granulated into specified form. Methods for mixing used herein include convective mixing by use of a rotating container-type mixer such as a concrete mixer and stirring by use of a fixed container-type mixer such as a stirring-type mixing granulating machine. These are appropriately selected according to circumstances.

The water-repellent substance mixed can take any form of slurry, particle, mass, melted state, and solution, but the form of particle, melted state, or solution is preferred in view of uniformity of the mixing, and of these, particle is particularly preferred in view of handling in production or production costs.

The particle size of the water-repellent substance that is particulate preferably ranges from 0.005 to 1 millimeter in view of the handling in production, and mixing with other raw materials and granulation.

Methods of the granulation performed after mixing are not particularly limited, and include rolling granulation, compressive granulation, stirring-type mixing granulation, extrusive granulation, crushing-type granulation, and fluidized-bed and fluidized-bed polyfunctional granulation. In the invention, however, application of rolling granulation, compressive granulation, stirring-type mixing granulation, and extrusive granulation are preferred.

Of these, the stirring-type mixing granulation enables mixing and granulation to carry out simultaneously in one machine, furthermore temperature conditions can be set with ease, and therefore this method can be preferably adopted in the invention. The stirring-type mixing granulating machine is not particularly limited in selection as long as raw materials can be suitably mixed and granulated, granulators having stirring blades selected from those of paddle-type, anchor-type, gate-type, double-motion paddle-type, ribbon-type, and screw-type are particularly preferred in the invention.

In the step of granulation, the temperature of the raw materials comprising the water-repellent substance, the sparingly water-soluble phosphatic fertilizer, the urea/aliphatic aldehyde condensation product, and water is not particularly limited. When the water-repellent substance used has a melting point falling in the range of from 60 to 130° C., however, the temperature of the raw materials is preferably a temperature 0 to 40° C. lower than the melting point of the water-repellent substance. When the temperature falls in this range, the water-repellent substance satisfactorily diffuses within fertilizer particles prepared through the step of drying.

The gas used in the step of drying is not particularly limited, but air, nitrogen, helium, or argon is adopted in general. Of these, air is preferably used in the invention in view of production costs.

The temperature of the gas must be that of the melting point or above of the water-repellent substance used. Use of the gas held at a temperature of the melting point or above causes increase in the effect of the water-repelling substance on control of the inorganizing speed of the urea/aliphatic aldehyde condensation product. The probable reason for this is that the water-repellent substance contained in the particles of the fertilizers of the invention is melt and thereby further diffused within the particles. In addition, the temperature of the gas is 500° C. at highest. Exceeding 500° C. may cause the urea/aliphatic aldehyde condensation products mixed to decompose in some cases.

Water is used as a raw material in the process for producing the fertilizers of the invention. The ratio of water used is not particularly limited, but preferably ranges from 5 to 30 weight percent to the total amount of the water-repellent substance, the sparingly water-soluble phosphatic fertilizer, and the urea/aliphatic aldehyde condensation product.

The respective kinds of the sparingly water-soluble phosphatic fertilizers, the urea/aliphatic aldehyde condensation products, and the water-repellent substances, the respective ratios of these substances used, and the method of mixing that are used to control the inorganizing speed of the condensation products of the invention correspond to the respective kinds of the substances, the respective ratios of these substances used, and the method of mixing that have been described above for producing the fertilizers of the invention.

The method of controlling the inorganizing speed of the urea/aliphatic aldehyde condensation products of the invention would enable the average inorganizing speed of the condensation products to control until the ratio of inorganization of the condensation products reaches 60 percent. When a fertilizer contains the sparingly water soluble phosphatic fertilizer where the elution time of phosphate components contained therein ranges from 0.1 to 2000 minutes and the urea/aliphatic aldehyde condensation product and has a particle size of from 2.36 to 3.35 millimeters, the average inorganizing speed can be regulated in the range of from 1 to 10 weight percent per day. When the water-repellent substance is contained, the average inorganizing speed can be adjusted in a much wider range.

The aforesaid average inorganizing speed is determined as follows. In a 2-liter vessel, 1 kilogram of air-dried soil (Andosol in Ueki-machi, Kumamoto Prefecture; virgin soil) that is allowed to pass through a screen of 2 millimeters is placed, and a urea/aliphatic aldehyde condensation product in an amount corresponding to 1.0 gram in total nitrogen and water in an amount reaching 60 percent of the maximum water holding capacity are added thereto and mixed. The vessel is covered with polyethylene film at the upper edge thereof and allowed to stand in a constant temperature chamber held at 30° C. The ratio of inorganization of the urea/aliphatic aldehyde condensation product is periodically measured, thus to obtain the average inorganizing speed. The average inorganizing speed may vary depending upon the amount of the fertilizer used to the amount of soil, the kind of soil, the amount of water added, circumstances where standing is allowed, and the like.

Processes for growing crops of the invention are not particularly limited in desired crops or an administration system of culture as long as the fertilizers of the invention or the urea/aliphatic aldehyde condensation products whose inorganizing speeds are controlled according to the process for controlling the inorganizing speed of the invention are used.

The fertilizers of the invention or the urea/aliphatic aldehyde condensation products whose inorganizing speeds are controlled according to the process for controlling the inorganizing speed of the invention can provide nitrogen components to plant in accordance with the periods of culture of desired crops and a pattern of absorbing nutrition. This is effective in saving of the number of additional fertilization or nitrogen components left in soil after the period of culture.

EXAMPLES

The invention is illustrated through the following examples below, but is not to be construed as limited by the examples. "%" used herein is weight percent unless otherwise noted.

1. Production of Fertilizers-1 (Examples 1 to 9 and Comparative Example 1)

Raw materials of the fertilizers as shown in Table 1 were mixed according to the respective ratios, and water was added to and mixed with the resulting mixtures by use of a kneader, thus to prepare mixtures (hereinafter abbreviated as "CDU mixtures") of sparingly water-soluble phosphatic fertilizers and CDU that is a kind of the urea/aliphatic aldehyde condensation product. The amount of water was adjusted so as to become 20% in the water content of the CDU mixtures. The ratios converted to $P_2O_5$ of sparingly water-soluble phosphoric acid and water-soluble phosphoric acid contained are shown in Table 2. The sparingly water-soluble phosphatic fertilizers used in the examples were a fused phosphatic fertilizer and a multi-phosphate.

The CDU mixtures were subjected to extrusive granulation by use of a screw-extruding granulator (screen diameter: 3.0 millimeters) to prepare particulate fertilizers. 3 kilograms of the particulate fertilizers were fed into a rotary disc type particle smoother (manufactured by Fuji Paudaru K.K., Marmelizer QJ400) and subjected to smoothing treatment under the following running conditions. After the treatment, the resulting fertilizers were dried at 100° C. for six hours by use of a hot air-circulating drying machine, and further classified with a shaking screen to collect particulate fertilizers having particle sizes of from 2.36 to 3.35 millimeters (Examples 1 to 9 and Comparative Example 1).

Running Conditions of Rotary Disc Type Particle-Smoothing Machine

Running System: Batch Type

Running time: 3 minutes

Pitch of Grating: 1 millimeter

Number of Rotation: 788 rpm

Amount Fed: 3 kilograms (each time)

TABLE 1

| | Composition of Raw Materials (Weight Ratio) | | | |
| --- | --- | --- | --- | --- |
| | CDU | Fused Phosphate Fertilizer | multi-phosphate | Potassium Sulfate |
| Example 1 | 100 | 0.025 | — | — |
| Example 2 | 100 | 0.05 | — | — |
| Example 3 | 100 | 0.5 | — | — |
| Example 4 | 100 | 5 | — | — |
| Example 5 | 100 | 25 | — | — |
| Example 6 | 100 | 35 | — | — |
| Example 7 | 100 | 5 | 1.6 | — |
| Example 8 | 100 | 5 | 2.3 | — |
| Example 9 | 100 | 5 | — | 10 |
| Comp. Ex. 1 | 100 | — | — | — |

Fused Phosphate Fertilizer: Manufactured by Minamikyushu Kagaku Kogyo K.K., Kumiai-Yorin 20-15-20 (Particles having passed through 0.5-millimeter screen and not having passed through 150-micrometer screen).
Multi-phosphate: Manufactured by Onoda Kagaku Kogyo K.K., 46 Jushorin (Particles having passed through 0.5-millimeter screen and not having passed through 150-micrometer screen).
CDU: Manufactured by Chisso Corp. Powdery-particulate 2-oxo-4-methyl-6-ureidohexahydropyrimidine (Particles having passed through 150-micrometer screen).
Potassium Sulfate: Manufactured by Wako Jun-yaku Kogyo K.K., Special Grade.

TABLE 2

| | Ratios of Sparingly Water-Soluble Phosphoric Acid and Water-Soluble Phosphoric Acid to CDU (Weight Ratio)*1 | |
| --- | --- | --- |
| | Sparingly Water-Soluble Phosphoric Acid | Water-Soluble Phosphoric Acid |
| Example 1 | 0.005 | — |
| Example 2 | 0.01 | — |
| Example 3 | 0.1 | — |
| Example 4 | 1 | — |
| Example 5 | 5 | — |
| Example 6 | 7 | — |
| Example 7 | 1 | 0.48 |
| Example 8 | 1 | 0.69 |
| Example 9 | 1 | — |
| Comp. Ex. 10 | — | — |

*1Ratio by weight to 100 of CDU

2. Measurement of Ratio of Inorganization in Soil

One kilogram of air-dried soil (Andosol, Ueki-machi, Kumamoto Prefecture, virgin soil) that passed through 2-millimeter screen was placed in each 2-liter vessel, and the fertilizers of Examples 1 to 9 and Comparative Example 1 in amounts corresponding to 1.0 gram in total nitrogen and water in an amount reaching 60% of the maximum water holding capacity were added and mixed to prepare soil samples for inorganization.

Vessels containing the soil samples for inorganization are covered with polyethylene film at the upper edges thereof and allowed to stand in a constant temperature chamber held at 30° C. After the elapse of a specified period of time, the soil was completely recovered and mixed well, and 10 grams of the soil were sampled.

The amount of inorganic nitrogen in the soil sampled was determined according to the method of simultaneous leaching-out measurement of inorganic nitrogen of the forms of ammonia, nitrite, and nitrate [a method as described in "Dojo Yobun Sokuteiho" (Method for Measuring Soil Nutrition), Yokendo, pp. 197-200].

All the tests were carried out according to three replicate determination system, and the test also was carried out as to soil undergoing no fertilization in order to determine the amount of inorganic nitrogen that is inherently contained in the soil. These operations were repeated, and the relation between the amount of nitrogen in the soil and days having elapsed was graphed to prepare a curve of the ratios of inorganization. The ratios of inorganization per day after the elapse of 10 days, 20 days, 30 days, and 60 days after fertilization were checked. Results are shown in Table 3. The ratio of inorganization per day in this table is defined as follows:

Ratio of Inorganization (%)=[(Amount of Nitrogen Inorganized in One Day of from (n−1)th Day to nth Day in the Total Amount of Soil Sample for Inorganization)/(Amount of Nitrogen Contained in Fertilizer before Fertilization)]×100 n: Days having elapsed after fertilization

TABLE 3

| | Ratio of Inorganization (%) | | | |
| --- | --- | --- | --- | --- |
| | After 10 Days | After 20 Days | After 30 Days | After 60 Days |
| Example 1 | 1.9 | 1.0 | 0.3 | 0.2 |
| Example 2 | 1.9 | 1.1 | 0.5 | 0.3 |
| Example 3 | 2.0 | 1.1 | 0.8 | 0.8 |
| Example 4 | 2.6 | 2.3 | 2.0 | — |
| Example 5 | 3.2 | 2.8 | 2.5 | — |
| Example 6 | 3.3 | 2.7 | 2.4 | — |
| Example 7 | 3.0 | 2.7 | 2.8 | — |
| Example 8 | 4.2 | 2.0 | 1.3 | — |
| Example 9 | 2.5 | 2.3 | 2.1 | — |
| Comp. Ex. 1 | 1.9 | 0.9 | 0 | 0 |

Results as shown in Table 3 reveal that the compositions of the invention can mitigate reduction in the inorganizing speed after the elapse of a certain period of time. Furthermore, it was confirmed that the amount of the sparingly water-soluble phosphatic fertilizer to the urea/aliphatic aldehyde condensation product desirably ranges from 0.01 to 5% in conversion to $P_2O_5$, and the amount of water-soluble phosphoric acid to the condensation product desirably ranges from 0 to 0.5% in conversion to $P_2O_5$.

3. Production of Fertilizers-2 (Examples 10 to 15)

Fertilizers having the compositions as shown in Table 4 were produced according to the following procedure.

A particulate sparingly water-soluble phosphatic fertilizer prepared in the following item "Preparation of a particulate sparingly water-soluble phosphatic fertilizer and measurement of the elution time of the resulting particulate sparingly water-soluble phosphatic fertilizer" and powdery-particulate CDU (having passed through 150-micrometer screen) were fed into a spherical mixer of 50-liter capacity in the ratios as shown in Table 4 so as to be 20 kilograms in total amount and mixed for five minutes.

Subsequently, 1 kilogram of the resulting mixture was placed in a rotary pan type granulator of 120-cm diameter, and water and the mixture were added by portions while rolling the mixture at 40 rpm and granulated until the average particle size reaches about 2.5 millimeters. After granulating, the resulting particles were dried at 120° C. for six hours by use of a hot air-circulating drying machine and furthermore classified with a shaking screen to obtain particulate fertilizers having particle sizes of from 0.71 to 0.85 millimeter and particles size of from 2.36 to 3.35 millimeters, respectively. In the example shown herein, a fused phosphatic fertilizer was used as the sparingly water-soluble phosphatic fertilizer.

"Preparation of particles of a sparingly water-soluble phosphatic fertilizer and measurement of the elution time of phosphoric acid in the resulting particles of a sparingly water-soluble phosphatic fertilizer"

The particles of the sparingly water-soluble phosphatic fertilizer as shown in Table 5 were classified with a shaking screen to prepare the sparingly water-soluble phosphatic fertilizers having specified particle diameters.

In a 300-milliliter plastic bottle, 2 grams of the particles of the sparingly water-soluble phosphatic fertilizer prepared by classification and 150 milliliters of 2 weight percent aqueous solution of citric acid heated at 30° C. were placed, and shaken by use of a shaking constant-temperature bath held at 30° C. Small portions of the supernatant solution were sampled at intervals and diluted with water to determine quantitatively a phosphoric acid component in the diluted solution by ion chromatography. A elution curve was drawn from measurements and the elution time of the phosphoric acid was calculated from the graph. Results are shown in Table 5.

TABLE 4

| | Composition of Raw Materials (Weight Ratio) | | Particle Size of Particulate Sparingly Water-Soluble Phosphatic Fertilizer (μm) | Particle Size of Particulate Fertilizer (mm) |
|---|---|---|---|---|
| | CDU | Sparingly Water-Soluble Phosphatic Fertilizer (Fused Phosphate Fertilizer) | | |
| Example 10 | 97 | 3 | 600-710 | 2.36-3.35 |
| Example 11 | 97 | 3 | 600-710 | 0.71-0.85 |
| Example 12 | 97 | 3 | 150-180 | 2.36-3.35 |
| Example 13 | 97 | 3 | 150-180 | 0.71-0.85 |
| Example 14 | 97 | 3 | 53-75 | 2.36-3.35 |
| Example 15 | 97 | 3 | 53-75 | 0.71-0.85 |

CDU: powdery-particulate 2-oxo-4-methyl-6-ureidohexahydropyrimidine (having passed through 150-μm screen). Manufactured by Chisso Corp.

TABLE 5

| Particle Size of Fused Phosphate Fertilizer (μm) | Time Required to Elute 80% of Phosphoric Acid (min) |
|---|---|
| 600-710 | 612 |
| 150-180 | 363 |
| 53-75 | 42 |

Fused Phosphate Fertilizer: Manufactured by Minamikyushu Kagaku Kogyo K.K., Kumiai-Yorin 20-15-20

TABLE 6

| | Average Speed of Inorganization (%/day) |
|---|---|
| Example 10 | 1.57 |
| Example 11 | 3.54 |
| Example 12 | 2.80 |
| Example 13 | 3.80 |
| Example 14 | 3.94 |
| Example 15 | 4.28 |

4. Measurement of Ratio of Inorganization in Soil

One kilogram of air-dried soil (red soil, Kokurakita-ku, City of Kitakyushu, Fukuoka Prefecture, virgin soil) that passed through 2-millimeter screen was placed in each 2-liter vessel, and the fertilizers of Examples 10 to 15 in amounts corresponding to 1.0 gram in total nitrogen and water in an amount reaching 60% of the maximum water holding capacity were mixed to prepare soil samples for inorganization.

The vessels containing the respective soil samples for inorganization were covered with polyethylene film at the upper edges and allowed to stand in a constant temperature chamber held at 30° C. After the elapse of specified periods of time (10 days and 30 days), the soil was all recovered, mixed well, and 10 grams of the soil was then sampled. The amounts of inorganic nitrogen in the soil sampled were measured according to "a method of simultaneous leaching-out measurement of the inorganic nitrogen of the forms of ammonia, nitrite, and nitrate in soil sampled" ("Dojo Yobun Sokuteiho", Yokendo, pp. 197 to 200).

All the tests were carried out according to three replicate determination system, and the test also was carried out as to soil undergoing no fertilization in order to determine the amount of inorganic nitrogen that is inherently contained in the soil sampled. This operation was repeated and the relation between the amount of inorganized nitrogen and days having elapsed was graphed to prepare a curve of the ratios of inorganization. The average ratio of inorganization in the term until the ratio of inorganization reached 60% was thus found. Results are shown in Table 6. The average ratio of inorganization in the table is defined as follows:

Average Ratio of Inorganization (%/day)=[60/(Days That Elapsed Until Inorganized Nitrogen Reached 60% of Fertilizer Applied)]×100

It was shown as to the fertilizers of the invention that control of the inorganizing speed of the urea/aliphatic aldehyde condensation product contained in the fertilizer would be possible by controlling the elution time of the phosphate components in the particulate sparingly water-soluble phosphatic fertilizer contained in the fertilizers based on the average inorganizing speed of the fertilizers of Examples 10 to 15. In addition, it also was shown that the particle size of the fertilizers that was 1 millimeter or more made it easier to control the inorganizing speed of the condensation product contained in the fertilizers.

5. Production of Fertilizers-3 (Examples 16 to 25 and Comparative Examples 2 to 4)

Particulate fertilizers having the compositions as shown in Table 7 were produced according to the following procedure.

In a 130-liter paddle-type stirring-mixing granulator (Manufactured by Matsuzaka Giken K.K. Rediegemixer Model FKM-130D), a powdery-particulate water repellent substance (having passed through 100-micrometer screen), a particulate sparingly water-soluble phosphatic fertilizer (particles of from 600 to 710 micrometers obtained by classification), and powdery-particulate CDU (having passed through 150-micrometer screen) were placed in the ratios as shown in Table 7 so as to be 20 kilograms in total amount and heated at 50° C. After mixing for five minutes, a specified amount of water was added, and granulation was carried out until the particle size reached about 2.5 millimeters. After granulation, particles were dried with a hot air-circulating drying machine of 120° C. for six hours and classified with shaking screens to collect particulate fertilizers having particle sizes of from 0.71 to 0.85 millimeter and particles sizes of from 2.36 to 3.35 millimeters, respectively. The sparingly water-soluble phosphatic fertilizer used in the present examples of production is a fused phosphate fertilizer.

TABLE 7

| | Composition of Raw Materials (Weight %) | | | Ratio of Phosphate Component ($P_2O_5$) to CDU (Weight %) | Particle Size (mm) |
|---|---|---|---|---|---|
| | CDU | Sparingly Water-Soluble Phosphatic Fertilizer (Fused Phosphate Fertilizer) | Water-Repellent Substance | | |
| Example 16 | 93.5 | 5.5 | 1 | 1.2 | 2.36-3.35 |
| Example 17 | 85 | 5 | 10 | 1.2 | 2.36-3.35 |
| Example 18 | 75.6 | 4.4 | 20 | 1.2 | 2.36-3.35 |
| Example 19 | 89.97 | 0.03 | 10 | 0.007 | 2.36-3.35 |
| Example 20 | 89.94 | 0.06 | 10 | 0.13 | 2.36-3.35 |
| Example 21 | 72 | 18 | 10 | 5 | 2.36-3.35 |
| Example 22 | 69 | 21 | 10 | 6 | 2.36-3.35 |
| Example 23 | 85 | 5 | 10 | 1.2 | 0.71-0.85 |
| Example 24 | 72 | 18 | 10 | 5 | 0.71-0.85 |
| Example 25 | 94.4 | 5.6 | — | 1.2 | 2.36-3.35 |
| Comp. Ex. 2 | 100 | — | — | — | 2.36-3.35 |
| Comp. Ex. 3 | 90 | — | 10 | — | 2.36-3.35 |
| Comp. Ex. 4 | 80 | — | 20 | — | 2.36-3.35 |

CDU: Manufactured by Chisso Corp.
Fused Phosphate Fertilizer: Manufactured by Minamikyushu Kagaku Kogyo K.K., Kumiai-Yorin 20-15-20
Water-Repellent Substance: Castor Wax F-P manufactured by Kokura Gosei Kogyo K.K., Hardened Castor 10 Oil, mp 81° C.

6. Production of Fertilizer-4 (Examples 26 to 30)

In a paddle-type stirring-mixing granulator (manufactured by Matsuzaka Giken K.K., Rediegemixer Model FKM-130D), 2 kilograms of Castor Wax F—P (particles having passed through 100-micrometer screen, manufactured by Kokura Gosei Kogyo K.K., hardened castor oil, mp 81° C.), 1 kilogram of a fused phosphate fertilizer (particles of from 600 to 710 micrometers prepared by classification, manufactured by Minamikyushu Kagaku Kogyo K.K., Kumiai-Yorin 20-15-20), and 17 kilograms of powdery-particulate CDU (having passed through 150-micrometer screen, manufactured by Chisso Corp.) were placed and heated in the granulator held at the temperatures as shown in Table 8. After mixing for five minutes, a specified amount of water was added, and granulation was carried out until the particle size reached about 2.5 millimeters. After granulation, the resulting particles were dried in a hot air-circulating drying machine held at the temperatures as shown in Table 8 for six hours, classified with shaking screens to collect a particulate fertilizer having particle sizes of from 2.36 to 3.35 millimeters. The hot air used in the drying machine was air.

TABLE 8

| | Temperature in Mixer (° C.) | Temperature of Hot Air (° C.) |
|---|---|---|
| Example 26 | 40 | 120 |
| Example 27 | 50 | 120 |
| Example 28 | 80 | 120 |
| Example 29 | 50 | 70 |
| Example 30 | 50 | 100 |

7. Measurement of Ratio of Inorganization in Soil

One kilogram of air-dried soil (soil of Minamata City, Kumamoto Prefecture, red-yellow virgin soil) was placed in each 2-liter vessel, and the fertilizers of Examples 16 to 30 and Comparative Examples 2 to 4 in amounts corresponding to 1.0 gram in total nitrogen and water in an mount reaching 60% of the maximum water holding capacity were added thereto and mixed to prepare soil samples for inorganization.

The vessels containing the soil samples for inorganization were covered with polyethylene film at the upper edges and allowed to stand at a constant temperature chamber held at 30° C. All the soil samples were recovered every 20 days and mixed well, and 10 grams of the soil were sampled. The amount of inorganic nitrogen in the soil sampled was measured according to the method of simultaneous leaching-out measurement of inorganic nitrogen of the forms of ammonia, nitrite, and nitrate ("Dojo Yobun Sokuteiho", Yokendo, pp. 197 to 200).

All the tests were carried out according to three replicate determination system, and the test also was carried out as to soil undergoing no fertilization in order to measure the amount of inorganic nitrogen that was inherently contained in the soil sampled. This operation was repeated, and the relation between the amount of inorganized nitrogen and days having elapsed was graphed to prepare a curve of the ratios of inorganization. The average ratios of inorganization in the term until 40 days elapsed and the term of from 40 days to 80 days after fertilization were found. Results are shown in Table 9. The average ratios of inorganization in the table are defined as follows:

Average Ratio of Inorganization (%/10days)=[(CDU Inorganized in the Term until 40 Days elapse after Fertilization)/(Total Amount of CDU Fertilized)]×100/4, and Average Ratio of Inorganization (%/10days)=[(CDU Inorganized in the Term of from 40 to 80 Days after Fertilization)/(Total Amount of CDU Fertilized)]×100/4

TABLE 9

| | Average Speed of Inorganization(%/10days) | |
|---|---|---|
| | 0 to 40 Days | 40 to 80 Days |
| Example 16 | 9.4 | 6.2 |
| Example 17 | 4.8 | 4.6 |
| Example 18 | 1.5 | 2.8 |
| Example 19 | 4.0 | 0.2 |
| Example 20 | 4.3 | 1.5 |

TABLE 9-continued

| | Average Speed of Inorganization(%/10days) | |
|---|---|---|
| | 0 to 40 Days | 40 to 80 Days |
| Example 21 | 10.5 | 9.5 |
| Example 22 | 10.7 | 9.8 |
| Example 23 | 13.4 | 9.5 |
| Example 24 | 13.3 | 9.8 |
| Example 25 | 13.3 | 3.3 |
| Example 26 | 4.7 | 4.7 |
| Example 27 | 4.6 | 4.0 |
| Example 28 | 3.8 | 5.2 |
| Example 29 | 8.2 | 6.2 |
| Example 30 | 4.6 | 3.9 |
| Comparative Example 2 | 9.3 | 1.5 |
| Comparative Example 3 | 4.5 | 0.1 |
| Comparative Example 4 | 1.3 | 0 |

It was shown from the average inorganizing speed of the fertilizers of Examples 16 to 30 and Comparative Example 2 to 4 that as to the fertilizers of the invention, the inorganizing speed of the urea/aliphatic aldehyde condensation products was able to be controlled in the whole fertilizer effective term of the fertilizers by the water-repellent substance having melting points falling in the range of from 60 to 130° C. and the sparingly water-soluble phosphatic fertilizer that the fertilizers contain. It also was shown, furthermore, that the ratio of the water-repellent substance to the total amount of the sparingly water-soluble phosphatic fertilizer, the water-repellent substance, and the urea/aliphatic aldehyde condensation product ranges from 0.1 to 20 weight percent, and the ratio of the sparingly water-soluble phosphatic fertilizer to the urea/aliphatic aldehyde condensation product preferably ranges from 0.01 to 5 weight percent in conversion to $P_2O_5$. It was shown, furthermore, that the particle size of the fertilizers of the invention that is 1 millimeter or more makes more easily the control of the inorganizing speed of the urea/aliphatic aldehyde condensation product contained.

About the process for producing the fertilizers of the invention in which the water-repellent substance is contained, it was found from the average inorganizing speeds of the particulate fertilizers of Examples 26 to 30 that the mixed paticles of the raw materials are appropriately treated with hot air held at a temperature not lower than the melting point (81° C.) of the water-repellent substance during the production of the fertilizers. Moreover, it was found effective that when a water-repellent substance used has a melting point falling in the range of from 60 to 100° C., the water-repellent substance, a sparingly water-soluble phosphatic fertilizer, a urea/aliphatic aldehyde condensation product, and water are placed in a stirring-mixing granulator and mixed and granulated in the granulator held at a temperature 0 to 40° C. lower than the melting point of the water-repellent substance, and subsequently dried with hot air held at a temperature not lower than the melting point (81° C.) of the water-repellent substance.

8. Test of Culture

Tests of tomato culture were carried out by use of the fertilizers of Examples 22 and 25 and Comparative Example 2 as nitrogenous fertilizers. The culture was performed in a farm (red soil) in Ashikita-machi, Kumamoto prefecture.

Seedlings (kind: Taiho) grown in the red soil gathered from the farm were planted in the farm after sufficient watering. In the planting of the seedlings, the row width was 90 centimeters and the interplant distance was 40 centimeters. The fertilizers of the invention broadcasted were spread over the farm together with a phosphatic fertilizer and a potassic fertilizer the day before planting.

The amounts of fertilizers applied were as follows:

Nitrogenous fertilizer (Examples 22 and 25 and Comparative Example 2): 12 kilograms of nitrogen (N) in conversion to 10a.

Potassium chloride ($K_2O$: 63.2%): 12 kilograms in conversion to $K_2O$.

Phosphatic fertilizer: 17 kilograms in conversion to $P_2O_5$ by use of calcium superphosphate ($P_2O_5$: 17.0%) in addition to the phosphatic fertilizer contained in the nitrogenous fertilizer (the fertilizer of Comparative Example 2 contains no phosphatic fertilizer).

The total weights of fruits set in the period of from 0 to 50 days after planting (the first period) and in the period of from 50 to 100 days after planting (the second period) are shown in a form of index in Table 10. Herein the indexes of total weights of fruits are values represented by weight ratios to the total weight of fruits of tomato cultured by use of the fertilizer of Comparative Example 2 that is taken as 100.

TABLE 10

| | Nitrogenous Fertilizer | Index of Total Weight of Fruits | | Ratio of CDU Decomposed (%) | |
|---|---|---|---|---|---|
| | | First Period | Second Period | 50 Days after Fertilization | 100 Days after Fertilization |
| Example 31 | Example 22 | 101 | 134 | 53 | 98 |
| Example 32 | Example 25 | 102 | 118 | 57 | 82 |
| Example 33 | Comp. Ex. 2 | 100 | 100 | 52 | 60 |

9. Quantitative Determination of Amount of CDU Left in Soil of Farm

In each 200-milliliter net bag (prepared from Chisso Right Net manufactured by Nippon Poly-Products K.K.), 100 grams of the soil of the farm used in "8. Test of Culture" were placed, the fertilizers of Examples 22 and 25 and Comparative Example 2 were mixed in amounts corresponding to 0.5 gram in the total nitrogen thereto, and then the bags were closed. The bags were buried in the farm on the day of fertilization of "the test of culture" and sampled after 50 days and 100 days after fertilization, and the CDU left in the net bags was quantitatively determined to calculate the ratios of CDU decomposed. The quantitative determination of CDU was carried out according to the procedure as described in "Shokai Hiryo Bunsekiho" (Second revised edition, Yokendoshuppan). Results are shown in Table 10.

About the method of culture of the invention, results as shown in Table 10 reveal that in the culture of tomato where the amount of nutrition absorbed is comparatively constant in many case, a stable yield is ensured until the second period ends, when a urea/aliphatic aldehyde condensation product having a constant decomposition rate to some degree is provided whole growing period.

What is claimed is:

1. A fertilizer comprising a sparingly water-soluble phosphatic fertilizer and a urea/aliphatic aldehyde condensation product other than urea/formaldehyde condensation product, and optionally a water-soluble phosphoric acid, wherein the sparingly water-soluble phosphatic fertilizer has elution characteristics where after 2 grams of the sparingly water-soluble phosphatic fertilizer is dipped in 150 milliliters of a 2 weight percent aqueous solution of citric acid at 30° C., the time required to allow elution of 80 weight percent of phosphate components contained in the phosphatic fertilizer into the aqueous solution of citric acid ranges from 0.1 to 2000 minutes and the ratio of the sparingly water-soluble phosphatic fertilizer in conversion to $P_2O_5$ to the urea/aliphatic aldehyde condensation product ranges from 0.01 to 5 weight percent.

2. The fertilizer of claim 1, wherein the urea/aliphatic aldehyde condensation product comprises 2-oxo-4-methyl-6-ureidohexahydropyrimidine.

3. The fertilizer of claim 1 wherein, a water-soluble phosphoric acid is present in the fertilizer, and the ratio of the water-soluble phosphoric acid in conversion to $P_2O_5$ to the urea/aliphatic aldehyde condensation product is 0.5 weight percent or less.

4. The fertilizer of claim 1, wherein the fertilizer comprises a particulate form.

5. The fertilizer of claim 4 wherein the particle size ranges from 1 to 50 millimeters.

6. The fertilizer of claim 4 further comprising a water-repellent substance mixed with the sparingly water-soluble phosphatic fertilizer and urea/aliphatic aldehyde condensation product.

7. The fertilizer of claim 6 wherein the water-repellent substance has a melting point falling in the range of from 60 to 130° C.

8. The fertilizer of claim 6 wherein the water-repellent substance comprises one or more of natural wax and synthetic wax.

9. The fertilizer of claim 8 wherein the natural wax comprises one or more of hardened castor oil and derivatives thereof.

10. The fertilizer of claim 6 wherein the ratio of the water-repellent substance to the total amount of the sparingly water-soluble phosphatic fertilizer, the water-repellent substance, and the urea/aliphatic aldehyde condensation product ranges from 0.1 to 20 weight percent.

11. A process for controlling an inorganizing speed of a urea/aliphatic aldehyde condensation product other than urea/formaldehyde condensation product, comprising adding to the urea/aliphatic aldehyde condensation product a sparingly water-soluble phosphatic fertilizer having elution characteristics where after 2 grams of the sparingly water-soluble phosphatic fertilizer is dipped in 150 milliliters of a 2 weight percent aqueous solution of citric acid at 30° C., the time required to allow elution of 80 weight percent of phosphate components contained in the phosphatic fertilizer into the aqueous solution of citric acid ranges from 0.1 to 2000 minutes, wherein the ratio of the added sparingly water-soluble phosphatic fertilizer in conversion to $P_2O_5$ to the urea/aliphatic aldehyde condensation product ranges from 0.01 to 5 weight percent.

12. The process of claim 11 wherein the urea/aliphatic aldehyde condensation product comprises 2-oxo-4-methyl-6-ureidohexahydropyrimidine.

13. The process of claim 11 further comprising mixing a water-repellent substance with the urea/aliphatic aldehyde condensation product.

14. The process of claim 13 wherein the water-repellent substance has a melting point falling in the range of from 60 to 130° C.

15. The process of claim 13 wherein the water-repellent substance comprises one or more of natural wax and synthetic wax.

16. The process of claim 15 wherein the natural wax comprises one or more of hardened castor oil and derivatives thereof.

17. The process of claim 13 wherein the ratio of the water-repellent substance to the total amount of the sparingly water-soluble phosphatic fertilizer, the water-repellent substance, and the urea/aliphatic aldehyde condensation product ranges from 0.1 to 20 weight percent.

18. A process for growing crops comprising administering to the crop the fertilizer of claim 1.

19. A process for growing crops comprising administering to the crop the fertilizer of claim 2.

20. A process for growing crops comprising administering to the crop the fertilizer of claim 4.

21. The fertilizer of claim 1, wherein the ratio of the sparingly water-soluble phosphatic fertilizer in conversion to $P_2O_5$ to the urea-aliphatic aldehyde condensation product ranges from 0.01 to 1 weight percent.

22. The process of claim 11, wherein the ratio of the sparingly water-soluble phosphatic fertilizer in conversion to $P_2O_5$ to the urea-aliphatic aldehyde condensation product ranges from 0.01 to 1 weight percent.

23. A process for growing crops comprising administering to the crops the fertilizer of claim 21.

* * * * *